US012761806B2

(12) United States Patent
Hua et al.

(10) Patent No.: US 12,761,806 B2
(45) Date of Patent: Oct. 13, 2026

(54) SOLID STATE DISK LONGEVITY THROUGH DYNAMIC ACTIVITY-BASED COMPRESSION

(71) Applicant: Dell Products L.P., Hopkinton, MA (US)

(72) Inventors: Kuolin Hua, Natick, MA (US); Malak Alshawabkeh, Franklin, MA (US); Ramesh Doddaiah, Westborough, MA (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 18/745,172

(22) Filed: Jun. 17, 2024

(65) Prior Publication Data

US 2025/0383781 A1 Dec. 18, 2025

(51) Int. Cl.
*G06F 3/06* (2006.01)

(52) U.S. Cl.
CPC .......... *G06F 3/0616* (2013.01); *G06F 3/0653* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 9,703,664 | B1 * | 7/2017 | Alshawabkeh | G06F 3/067 |
| 10,310,747 | B2 * | 6/2019 | Owa | G06F 3/0661 |
| 2009/0112949 | A1 * | 4/2009 | Ergan | G06F 12/0802 |
| 2010/0250831 | A1 * | 9/2010 | O'Brien | G06F 11/3433 711/170 |
| 2016/0283159 | A1 * | 9/2016 | Gopal | G06F 3/0638 |
| 2017/0242592 | A1 * | 8/2017 | Camp | G06F 3/0616 |
| 2018/0046381 | A1 * | 2/2018 | Fagiano | G06F 3/0685 |
| 2019/0018788 | A1 * | 1/2019 | Yoshida | G06F 12/0246 |
| 2021/0216475 | A1 * | 7/2021 | Kucherov | G06F 12/0871 |
| 2021/0263682 | A1 * | 8/2021 | Jeon | G06F 3/0631 |

* cited by examiner

*Primary Examiner* — Jared I Rutz
*Assistant Examiner* — Alexander J Yoon
(74) *Attorney, Agent, or Firm* — Anderson Gorecki LLP

(57) ABSTRACT

The wear rate of SSDs of a drive array is monitored and the ratio of compressed data to uncompressed data stored on the SSDs is dynamically adjusted to converge the wear rate of the SSDs with a target wear rate. The ratio of compressed data to uncompressed data may be determined by a dynamic activity-based compression threshold. Extents on one side of the threshold are compressed and extents on the other side of the threshold are not compressed. Data access activity is monitored at the extent level and a time series model is used to calculate an updated activity-based compression threshold to converge the wear rate of the SSDs with a target wear rate.

20 Claims, 4 Drawing Sheets

IO activity distribution

SOLID STATE DISK LONGEVITY THROUGH DYNAMIC ACTIVITY-BASED COMPRESSION

TECHNICAL FIELD

The subject matter of this disclosure is generally related to data storage systems.

BACKGROUND

Data storage systems such as storage arrays, storage area networks (SANs), and network-attached storage (NAS) can be used to maintain data for multi-client host applications that run on clusters of host servers. Examples of the host applications may include, but are not limited to, software for email, accounting, manufacturing, inventory control, and a wide variety of other business processes. The data storage systems often use solid-state drives (SSDs) for persistent data storage because of their access latency characteristics. However, SSDs rely on memory cells that can only perform a limited number of program/erase (P/E) cycles before failure. SSDs write data in units of pages and erase data in larger units called blocks. Incoming write IO data is written into pages in a target block that has free space. If data in existing pages is being logically overwritten by a write IO, then those pages are not physically overwritten to service the write IO but are marked as stale, i.e., the new data is written to a different block. Blocks are erased after they accumulate enough stale pages to justify being recycled. Thus, write IOs often result in relocation of the data. Data may also be relocated within an SSD to balance wear across blocks. These and other aspects of SSD operation cause "write amplification," meaning that the amount of data that is written to the memory cells of an SSD to service a write IO is greater than the size of the write IO. Write amplification increases P/E cycles. The rated endurance of an SSD, which is indicative of expected service life, may be expressed in terms of drive writes per day (DWPD). DWPD corresponds to the number of times the entire capacity of an SSD can be written to per day over its warranty period. SSDs may report their current wear level in terms of the used percentage of expected service life, e.g., starting from 0% at installation and reaching 100% at end of service life.

SUMMARY

A method in accordance with some embodiments comprises: iteratively monitoring wear rate of solid-state drives (SSDs) of a drive array and dynamically adjusting a ratio of compressed data to uncompressed data stored on the SSDs to converge wear rate of the SSDs with a target wear rate.

An apparatus in accordance with some embodiments comprises: a storage system comprising at least one compute node configured to manage access to solid-state drives (SSDs), the compute node comprising hardware resources including multi-core processors, memory, and data compression controller adapted to: iteratively monitor wear rate of solid-state drives (SSDs) of a drive array and dynamically adjust a ratio of compressed data to uncompressed data stored on the SSDs to converge wear rate of the SSDs with a target wear rate.

In accordance with some embodiments, a non-transitory computer-readable storage medium stores instructions that when executed by a computer perform a method comprising: iteratively monitoring wear rate of solid-state drives (SSDs) of a drive array and dynamically adjusting a ratio of compressed data to uncompressed data stored on the SSDs to converge wear rate of the SSDs with a target wear rate.

This summary is not intended to limit the scope of the claims or the disclosure. All examples, embodiments, aspects, implementations, and features can be combined in any technically possible way. Method and process steps may be performed in any order.

BRIEF DESCRIPTION OF THE FIGURES

FIG. 5 illustrates a core matrix.

Various features and advantages will become more apparent from the following detailed description of exemplary embodiments in conjunction with the drawings.

DETAILED DESCRIPTION

The terminology used in this disclosure should be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" refer to features that are abstractions of other features such as, for example, and without limitation, tangible features. The term "physical" refers to tangible features that possibly include, but are not limited to, electronic hardware. For example, multiple virtual computers could operate simultaneously on one physical computer. The term "logic," if used, refers to special purpose physical circuit elements, firmware, software, computer instructions that are stored on a non-transitory computer-readable medium and implemented by multi-purpose tangible processors, and any combinations thereof. Embodiments are described in the context of a data storage system that includes host servers and storage arrays. Such embodiments are not limiting.

Some embodiments, aspects, features, and implementations include machines such as computers, electronic components, optical components, and processes such as computer-implemented procedures and steps. The computer-implemented procedures and steps are stored as computer-executable instructions on a non-transitory computer-readable medium. The computer-executable instructions may be executed on a variety of tangible processor devices, i.e., physical hardware. For practical reasons, not every step, device, and component that may be part of a computer or data storage system is described herein. Those steps, devices, and components are part of the knowledge generally available to those of ordinary skill in the art. The corresponding systems, apparatus, and methods are therefore enabled and within the scope of the disclosure.

Some aspects of activity-based compression are described in U.S. Pat. No. 10,359,960 of Alshawabkeh titled ALLOCATING STORAGE VOLUMES BETWEEN COMPRESSED AND UNCOMPRESSED STORAGE TIERS, which is incorporated by reference.

Figure 1:
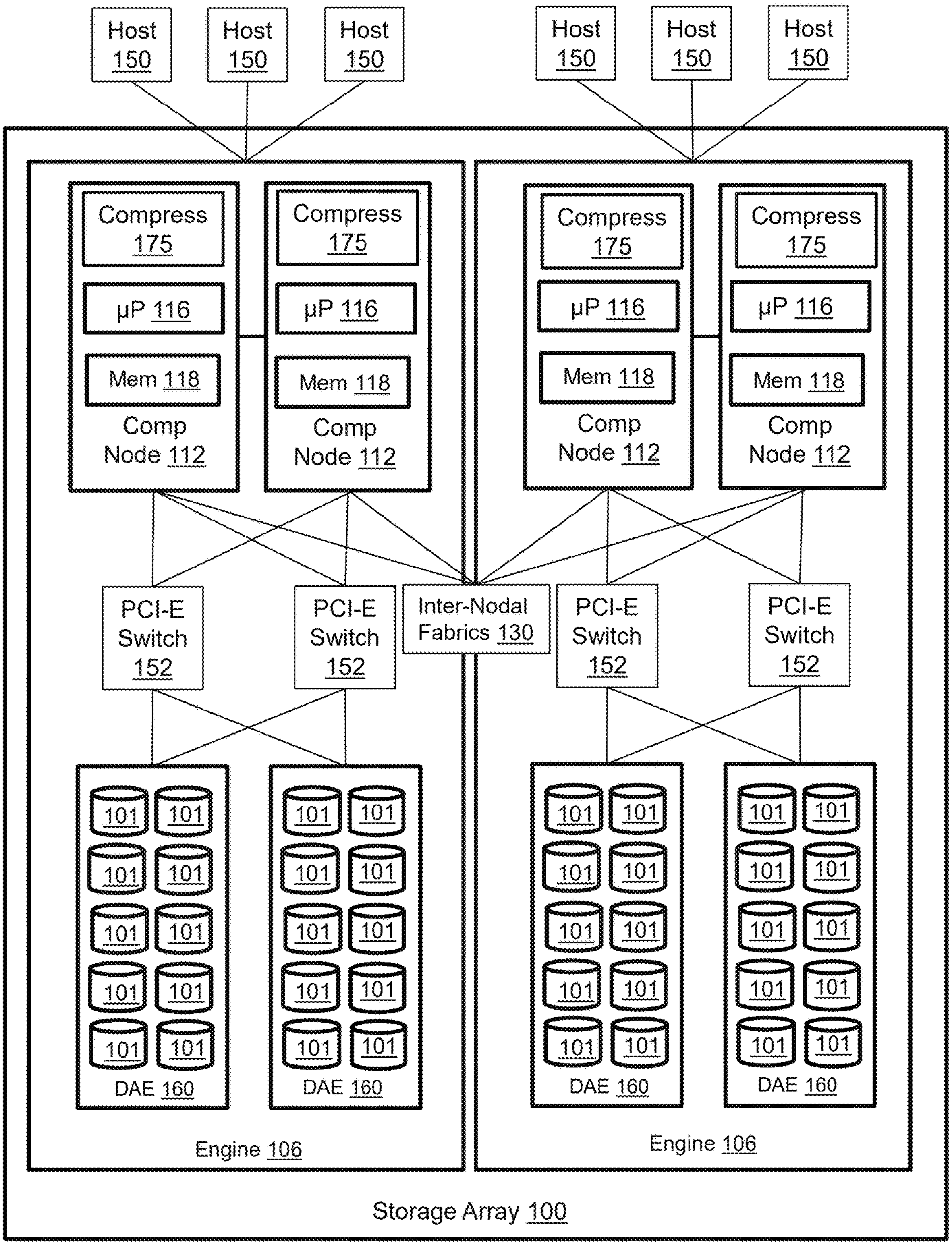
FIG. 1 illustrates a storage system with data compression controllers that implement dynamic activity-based compression.

FIG. 1 illustrates a storage system with data compression controllers 175 that implement dynamic activity-based compression (ABC). IO activity is monitored on an extent-level basis for all SSDs in the storage system, where an extent E1 is a sequence of N tracks on a device D1. Extent size is a design choice but is smaller than individual SSD storage capacity. Extents on one side of an activity threshold are stored on the SSDs in a compressed state. Extents that are on the other side of the activity threshold are stored on the SSDs in an uncompressed state. For example, an activity threshold could define that the most active 20% of extents are stored uncompressed while the remaining 80% are stored compressed. In the context of the activity threshold, activity may correspond to frequency of access within a predetermined time window looking back from present time. For example, an extent that was accessed X many times within the time window may be considered to be "hot," whereas an extent that was not accessed X many times within the time window may be considered to be "cold," with X being predetermined and the threshold defining the separation between hot and cold extents. Storing hot extents in an uncompressed state improves storage system performance by avoiding resource usage and access latency associated with performing compression and decompression. Storing extents in a compressed state tends to reduce wear rate by reducing write amplification. Wear rate is the rate of change in wear level over time, e.g., per day. Each SSD has a wear rate and the wear rates of all SSDs are in the storage system are represented as an aggregated value. An aggregate target wear rate may be predetermined or dynamically adjusted as SSD wear rates change. The activity threshold is dynamically updated based on whether the current aggregate wear rate of the SSDs is greater than, less than, or equal to the aggregate target wear rate. If the current wear rate of the SSDs is greater than the target wear rate, then the activity threshold is reduced, thereby increasing the percentage of compressed data, which reduces write amplification and tends to reduce wear rate. If the current wear rate of the SSDs is less than the target wear rate, then the activity threshold is increased, thereby increasing the percentage of uncompressed data, which tends to improve performance. If the current wear rate of the SSDs is equal to the target wear rate, then the activity threshold is not changed. Consequently, the service life of the SSDs is more predictable and performance in terms of maintaining low data access latency is facilitated.

The specifically illustrated storage system is a storage array 100, but other types of storage systems could be used with dynamic ABC. Storage array 100 is shown with two engines 106, each including disk array enclosures (DAEs) 160 and a pair of peripheral component interconnect express (PCI-E) interconnected compute nodes 112 (aka storage directors) in a failover relationship. Within each engine, the compute nodes and DAEs are interconnected via redundant PCI-E switches 152. Each DAE includes managed drives 101 that are solid-state drives (SSDs) that may be based on nonvolatile memory express (NVMe) and EEPROM technology such as NAND and NOR flash memory. Each compute node is implemented as a separate printed circuit board (PCB) and includes resources such as multi-core processors 116 and local memory IC chips 118. Processors 116 may include central processing units (CPUs), graphics processing units (GPUs), or both. The local memory 118 may include volatile media such as dynamic random-access memory (DRAM), non-volatile memory (NVM) such as storage class memory (SCM), or both. Each compute node allocates a portion of its local memory 118 to a shared memory that can be accessed by all compute nodes of the storage array using direct memory access. Each compute node includes one or more adapters and ports for communicating with host servers 150 to service IOs from the host servers. Each compute node also includes one or more adapters for communicating with other compute nodes via redundant inter-nodal channel-based InfiniBand fabrics 130. The data compression controllers 175 may include software stored on the managed drives and memory, software running on the processors, hardware, firmware, and any combinations thereof. Moreover, the data compression controllers may implement data reduction via deduplication, compression, or both.

Figure 2:
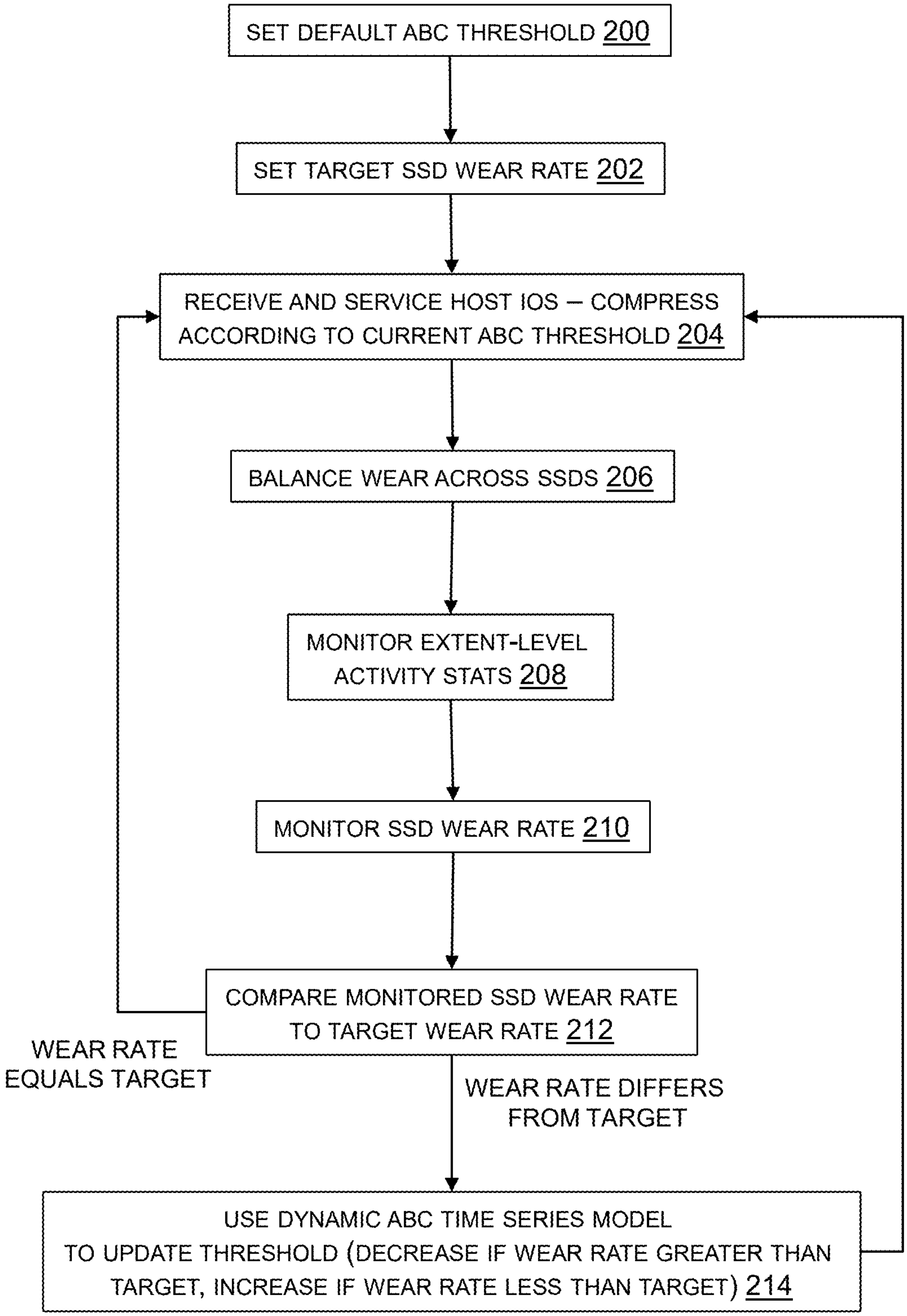
FIG. 2 illustrates a method for dynamically updating an activity-based compression threshold.

FIG. 2 illustrates a method for dynamically updating an ABC threshold. The ABC threshold is set to a default value in step 200. For context, the default ABC threshold may be 20%, meaning that the most active 20% of extents are stored on the SSDs in an uncompressed state and the remaining 80% of extents are stored in a compressed state. The ABC threshold is applied to all SSDs in the array. A target SSD wear rate is set in step 202. For context, the target SSD wear rate may indicate a change in the remaining percentage of DWPD for a unit of time, e.g., X % per week, corresponding to the warranty of the SSD. Host write IOs are received and serviced in step 204, including compressing, or not compressing, extents in accordance with the current ABC threshold. The data written to the SSDs is balanced across the drives in a manner that generally balances wear as indicated in step 206. Consequently, all SSDs in the array will have the same or similar remaining percentage DWDP. Extent level activity statistics are monitored as indicated in step 208. The activity statistics include both read IO and write IO accesses to individual extents. The SSD wear rate is monitored as indicated in step 210. For example, the SSDs may be periodically polled to obtain their remaining percentage DWDP, and the current wear rate calculated as the change in remaining percentage DWDP between values taken in sequence at the start and end of the predetermined time interval. Because of wear balancing across SSDs, the current wear rate should be consistent across all the SSDs of the array. The monitored (current) wear rate is compared with the target wear rate in step 212. If the monitored wear rate equals the target wear rate, then flow returns to step 204. If the monitored wear rate differs from the target wear rate, then a dynamic ABC time series model is used to update the ABC threshold as indicated in step 214 to converge the wear rate with the target wear rate. The time series model uses the extent activity statistics to determine an ABC threshold that will achieve the target wear rate at current activity levels. If the monitored wear rate is greater than the target wear rate, i.e., the SSDs are wearing out more quickly than planned, then the ABC threshold is decreased by an amount indicated by the time series model. Decreasing the ABC threshold reduces the amount of data stored in an uncompressed state, thereby reducing write amplification and wear rate. If the monitored wear rate is less than the target wear rate, i.e., the SSDs are wearing out less quickly than planned, then the ABC threshold is increased by an amount indicated by the time series model. Increasing the ABC threshold increases the amount of data stored in an uncompressed state, thereby improving performance at the expense of increased write amplification and wear rate. Flow returns to step 204 and the updated ABC threshold is applied. As a result, the actual wear rate of the SSDs over multiple adjustment cycles tends to track the target wear rate. This is generally advantageous because it facilitates planning of service calls for SSD replacement and helps to avoid system failure.

Figure 3:
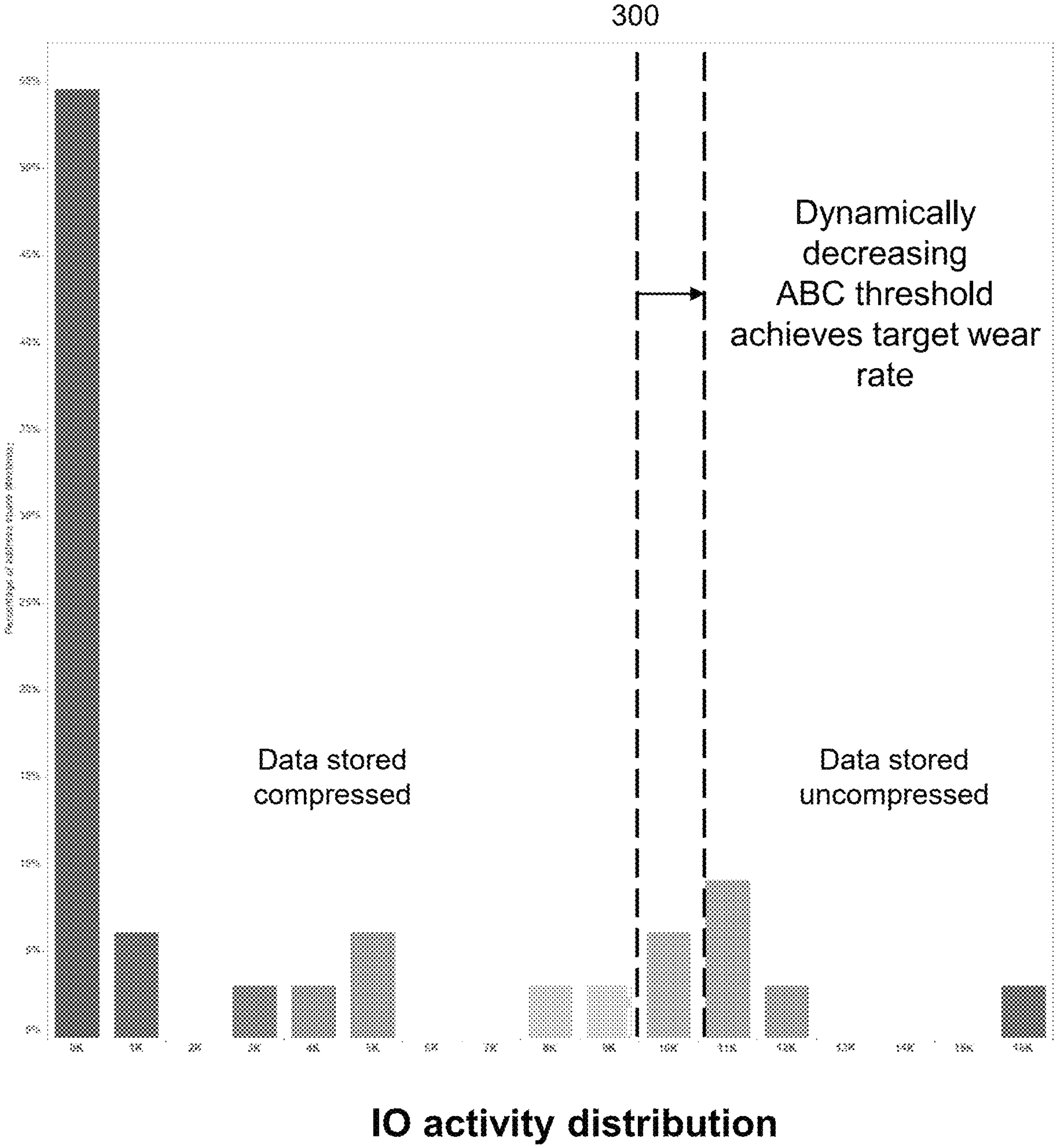
FIG. 3 illustrates a decreasing activity-based compression threshold.

FIG. 3 illustrates a dynamically decreased ABC threshold 300. IO activity distribution is represented by access frequency bins. Each extent is associated with the bin corresponding to the number of times it has been accessed in the time window. Extent-to-bin association can change as the number of accesses to the extent changes. Extents in bins to the right of the ABC threshold, which are the more frequently accessed extents, are stored uncompressed. Extents in bins to the left of the ABC threshold, which are the less frequently accessed extents, are stored compressed. Decreasing the ABC threshold reduces the amount of data stored in an uncompressed state, thereby reducing write amplification and wear rate.

Figure 4:
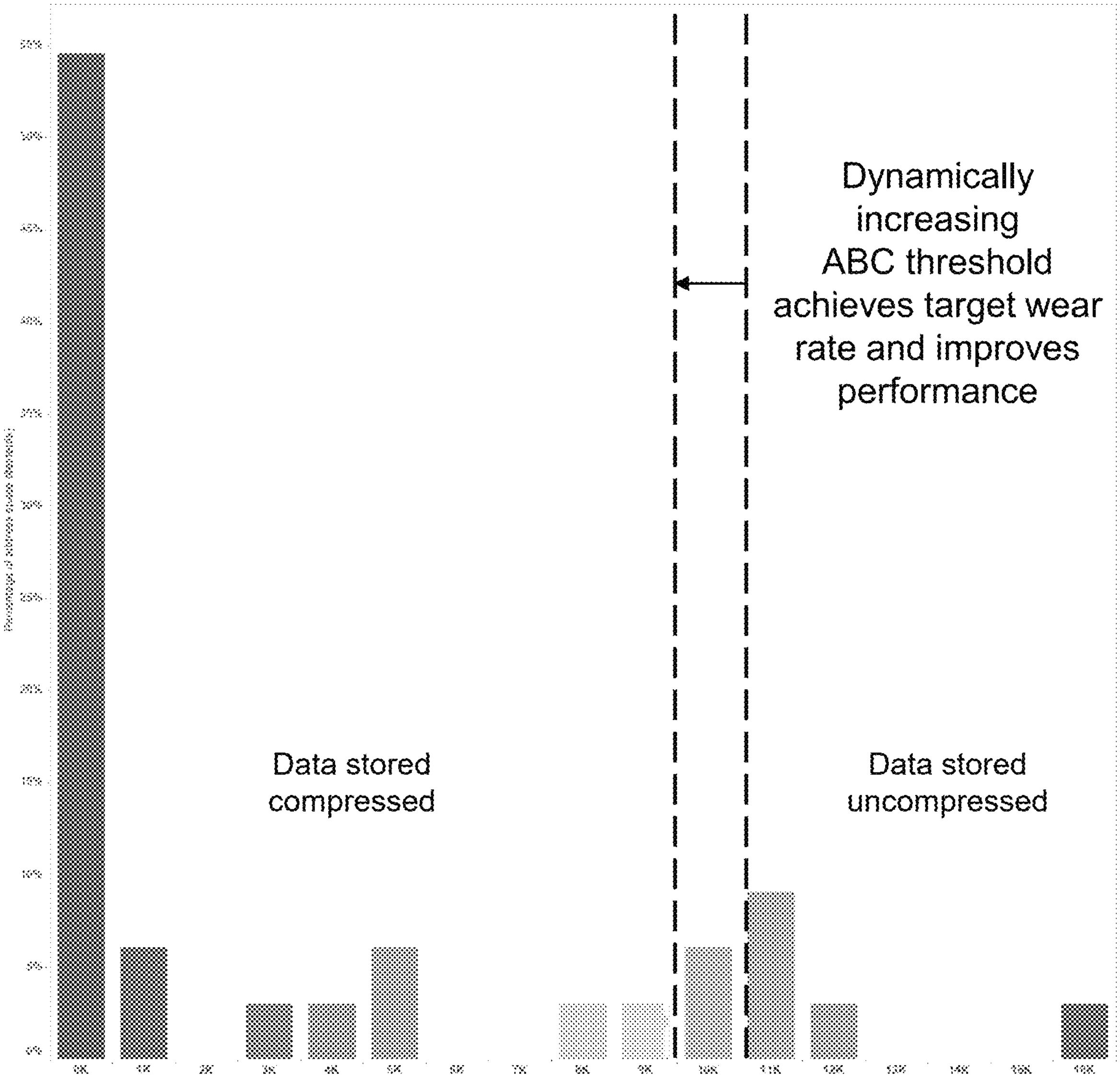
FIG. 4 illustrates an increasing activity-based compression threshold.

FIG. 4 illustrates a dynamically increased ABC threshold. Extents in bins to the right of the ABC threshold, which are the more frequently accessed extents, are stored uncompressed. Extents in bins to the left of the ABC threshold, which are the less frequently accessed extents, are stored compressed. Decreasing the ABC threshold reduces the amount of data stored in an uncompressed state, thereby reducing write amplification and wear rate.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method comprising: iteratively monitoring wear rate of solid-state drives (SSDs) of a drive array for which an activity based compression (ABC) threshold is used to determine whether extents are accessed frequently enough to be stored as uncompressed data to reduce data compression and decompression overhead or not accessed frequently enough to be stored as uncompressed data and therefore are stored as compressed data to reduce storage capacity requirements, the ABC threshold defining a ratio of compressed data to uncompressed data stored on the SSDs; and converging wear rate of the SSDs with a target wear rate by dynamically adjusting the ABC threshold to change the ratio of compressed data to uncompressed data stored on the SSDs to change write amplification in the SSDs to change the wear rate of the SSDs, where increasing the ratio of compressed data to uncompressed data reduces the wear rate by reducing the write amplification.

2. The method of claim 1 further comprising dynamically updating the ABC threshold to converge the wear rate of the SSDs with the target wear rate based on whether current aggregate wear rate of the SSDs is greater than, less than, or equal to an aggregate target wear rate.

3. The method of claim 2 further comprising balancing wear across the SSDs.

4. The method of claim 3 further comprising using a time series model of extent activity to determine an updated ABC threshold to converge the wear rate of the SSDs with the target wear rate.

5. The method of claim 4 further comprising decreasing the ABC threshold by a first amount indicated by the time series model in response to determining that a monitored wear rate is greater than the target wear rate.

6. The method of claim 5 further comprising increasing the ABC threshold by a second amount indicated by the time series model in response to determining that the monitored wear rate is less than the target wear rate.

7. The method of claim 6 further comprising not updating the ABC threshold in response to determining that the monitored wear rate is equal to the target wear rate.

8. An apparatus comprising: a storage system comprising at least one compute node configured to manage access to solid-state drives (SSDs), the compute node comprising hardware resources including multi-core processors, memory, and data compression controller adapted to: iteratively monitor wear rate of solid-state drives (SSDs) of a drive array for which an activity based compression (ABC) threshold is used to determine whether extents are accessed frequently enough to be stored as uncompressed data to reduce data compression and decompression overhead or not accessed frequently enough to be stored as uncompressed data and therefore are stored as compressed data to reduce storage capacity requirements, the ABC threshold defining a ratio of compressed data to uncompressed data stored on the SSDs; and converging wear rate of the SSDs with a target wear rate by dynamically adjusting the ABC threshold to change the ratio of compressed data to uncompressed data stored on the SSDs to change write amplification in the SSDs to change the wear rate of the SSDs, where increasing the ratio of compressed data to uncompressed data reduces the wear rate by reducing the write amplification.

9. The apparatus of claim 8 further comprising the data compression controller adapted to dynamically update the ABC threshold to converge the wear rate of the SSDs with the target wear rate based on whether current aggregate wear rate of the SSDs is greater than, less than, or equal to an aggregate target wear rate.

10. The apparatus of claim 9 further comprising the data compression controller adapted to balance wear across the SSDs.

11. The apparatus of claim 10 further comprising the data compression controller adapted to use a time series model of extent activity to determine an updated ABC threshold to converge the wear rate of the SSDs with the target wear rate.

12. The apparatus of claim 11 further comprising the data compression controller adapted to decrease the ABC threshold by a first amount indicated by the time series model in response to determining that a monitored wear rate is greater than the target wear rate.

13. The apparatus of claim 12 further comprising the data compression controller adapted to increase the ABC threshold by a second amount indicated by the time series model in response to determining that the monitored wear rate is less than the target wear rate.

14. The apparatus of claim 13 further comprising the data compression controller adapted to not update the ABC threshold in response to determining that the monitored wear rate is equal to the target wear rate.

15. A non-transitory computer-readable storage medium storing instructions that when executed by a computer perform a method comprising: iteratively monitoring wear rate of solid-state drives (SSDs) of a drive array for which an activity based compression (ABC) threshold is used to determine whether extents are accessed frequently enough to be stored as uncompressed data to reduce data compression and decompression overhead or not accessed frequently enough to be stored as uncompressed data and therefore are stored as compressed data to reduce storage capacity requirements, the ABC threshold defining a ratio of compressed data to uncompressed data stored on the SSDs; and converging wear rate of the SSDs with a target wear rate by dynamically adjusting the ABC threshold to change the ratio of compressed data to uncompressed data stored on the SSDs to change write amplification in the SSDs to change the wear rate of the SSDs, where increasing the ratio of compressed data to uncompressed data reduces the wear rate by reducing the write amplification.

16. The non-transitory computer-readable storage medium of claim 15 in which the method further comprises dynamically updating the ABC threshold to converge the wear rate of the SSDs with the target wear rate based on whether current aggregate wear rate of the SSDs is greater than, less than, or equal to an aggregate target wear rate.

17. The non-transitory computer-readable storage medium of claim 16 in which the method further comprises balancing wear across the SSDs.

18. The non-transitory computer-readable storage medium of claim 17 in which the method further comprises using a time series model of extent activity to determine an updated ABC threshold to converge the wear rate of the SSDs with the target wear rate.

19. The non-transitory computer-readable storage medium of claim 18 in which the method further comprises decreasing the ABC threshold by a first amount indicated by the time series model in response to determining that a monitored wear rate is greater than the target wear rate.

20. The non-transitory computer-readable storage medium of claim 19 in which the method further comprises increasing the ABC threshold by a second amount indicated by the time series model in response to determining that monitored wear rate is less than the target wear rate.

* * * * *